US012571415B2

(12) United States Patent
Bowers et al.

(10) Patent No.: US 12,571,415 B2
(45) Date of Patent: Mar. 10, 2026

(54) FASTENER STANDOFF MOUNT

(71) Applicants: Ned C Bowers, Mount Dora, FL (US); Russell Ortner, Apopka, FL (US)

(72) Inventors: Ned C Bowers, Mount Dora, FL (US); Russell Ortner, Apopka, FL (US)

( * ) Notice: Subject to any disclaimer, the term of this patent is extended or adjusted under 35 U.S.C. 154(b) by 0 days.

(21) Appl. No.: 19/084,259

(22) Filed: Mar. 19, 2025

(65) Prior Publication Data

US 2025/0297628 A1 Sep. 25, 2025

Related U.S. Application Data

(60) Provisional application No. 63/567,102, filed on Mar. 19, 2024.

(51) Int. Cl.
| | |
|---|---|
| *F16B 39/24* | (2006.01) |
| *F16B 5/02* | (2006.01) |
| *F16B 39/282* | (2006.01) |

(52) U.S. Cl.
CPC ................ *F16B 5/02* (2013.01); *F16B 39/24* (2013.01); *F16B 39/282* (2013.01)

(58) Field of Classification Search
CPC ...... F16B 43/00; F16B 41/002; F16B 5/0258; F16B 19/02; F16B 37/044; F16B 35/06; F16B 5/02; E04B 1/4164
See application file for complete search history.

(56) References Cited

U.S. PATENT DOCUMENTS 4,231,279 A * 11/1980 Theriot ................... F16B 43/00
411/396

5,442,150 A * 8/1995 Ipcinski ............... H01H 13/023
200/314
6,079,179 A 6/2000 Shoemaker, Jr.
6,669,419 B1 * 12/2003 Fleetwood ............. F16B 43/00
411/533
8,854,829 B1 10/2014 Bopp et al.
9,068,339 B2 6/2015 Schaefer et al.
9,134,044 B2 9/2015 Stearns et al.
10,211,773 B2 2/2019 Jasmin et al.

(Continued)

OTHER PUBLICATIONS

CS922 Technical Drawing by Click Bond, published May 4, 2010 in the United States.

(Continued)

*Primary Examiner* — Jason L Vaughan
*Assistant Examiner* — Amanda Kreiling
(74) *Attorney, Agent, or Firm* — Wolter Van Dyke Davis, PLLC; Robert L. Wolter; Patrick Herron

(57) ABSTRACT

A standoff mount (10), including:

a base (12) having: a flange (14) that defines at least part of a flat bottom surface (30); and a raised portion (16) that extends upward from the flange and that comprises a top end (12A) facing opposite the flat bottom surface;

a recess (18) that is recessed into the flat bottom surface and that comprises two parallel flat surfaces (18B, 18C) that are dimensioned to trap therebetween a hex head of a conventional fastener and thereby prevent rotation of the hex head; and a cylindrically shaped aperture (20) that originates at the recess, that extends through the top end of the raised portion, that is aligned with the recess, and that comprises a diameter which corresponds to a diameter of a threaded stud of the conventional fastener.

18 Claims, 9 Drawing Sheets

Section D-D

(56)         References Cited

U.S. PATENT DOCUMENTS

| 11,374,531 | B2 | 6/2022 | Stearns et al. |
| 2007/0134972 | A1 | 6/2007 | Hoy |
| 2021/0289652 | A1 | 9/2021 | Fan et al. |
| 2021/0355980 | A1 | 11/2021 | Polidori |
| 2023/0250629 | A1 | 8/2023 | Meine |

OTHER PUBLICATIONS

CB4002 Technical Drawing by Click Bond published Mar. 23, 2008
in the United States.

* cited by examiner

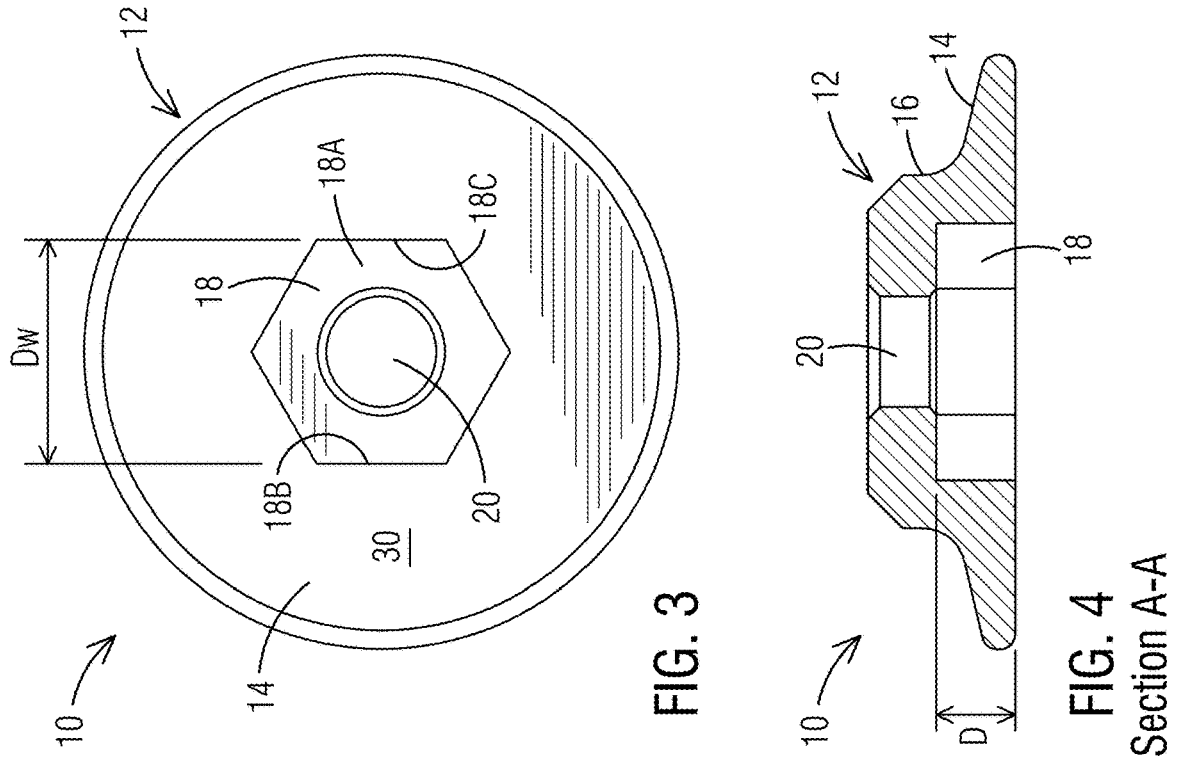
FIG. 3
FIG. 4
Section A-A
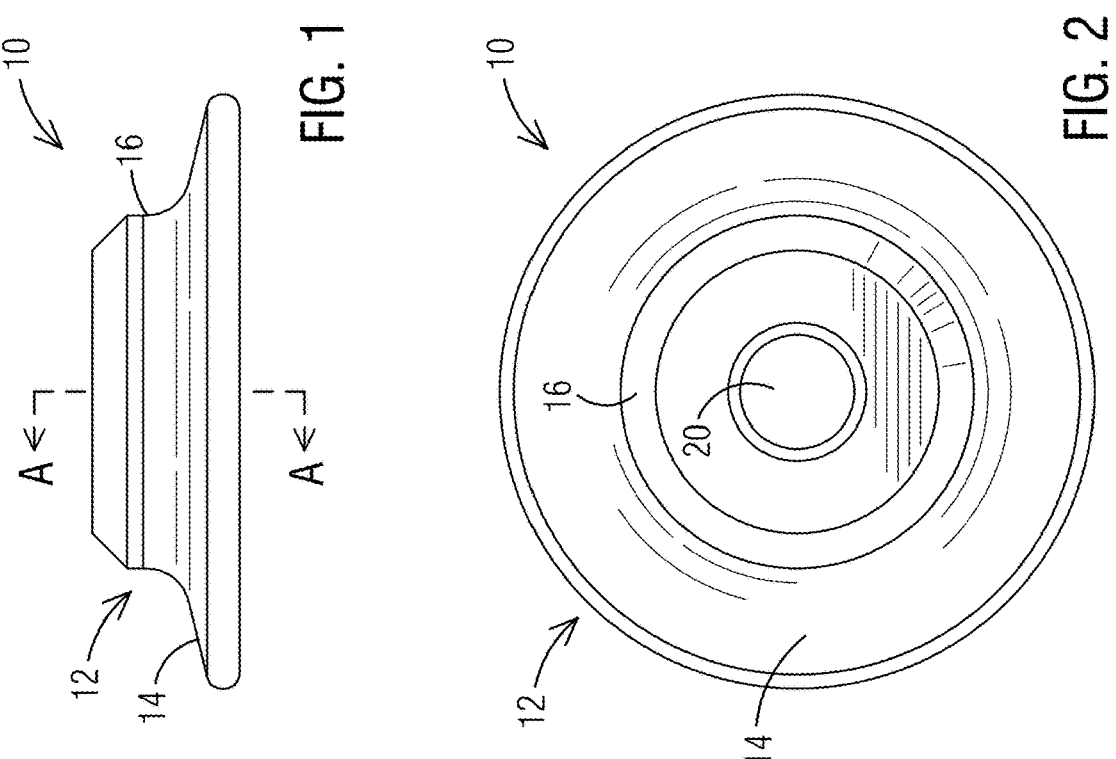
FIG. 1
FIG. 2

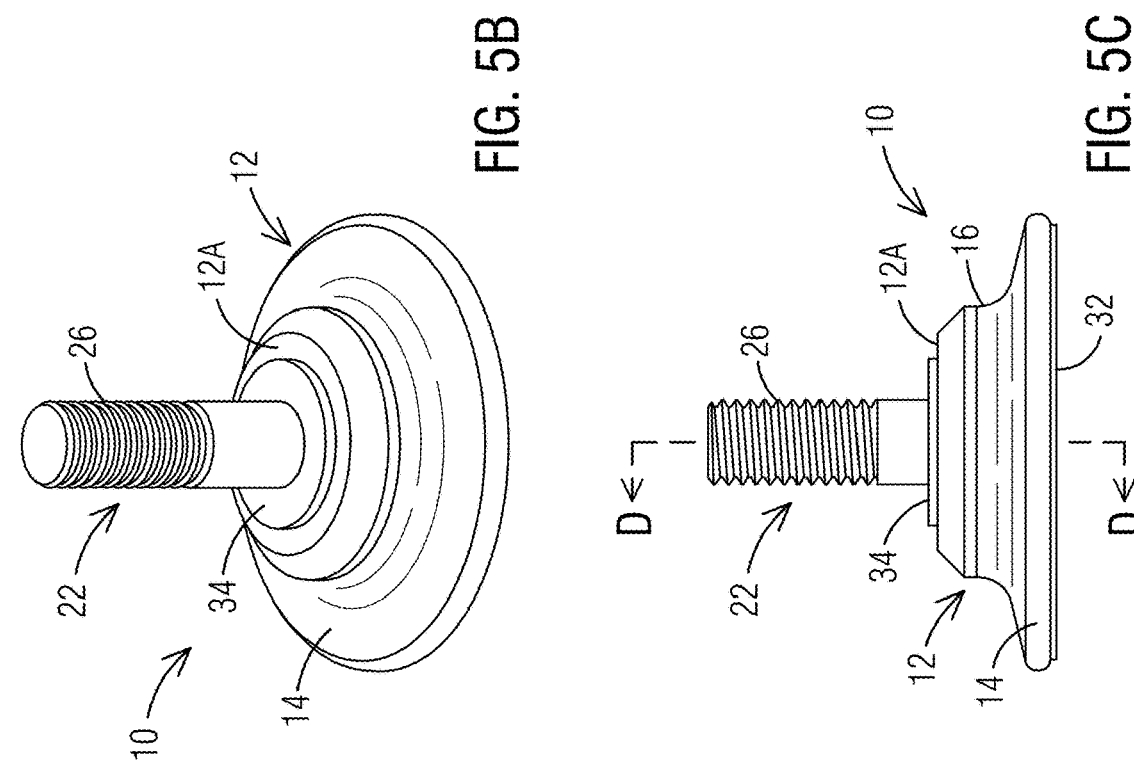
FIG. 5B
FIG. 5C
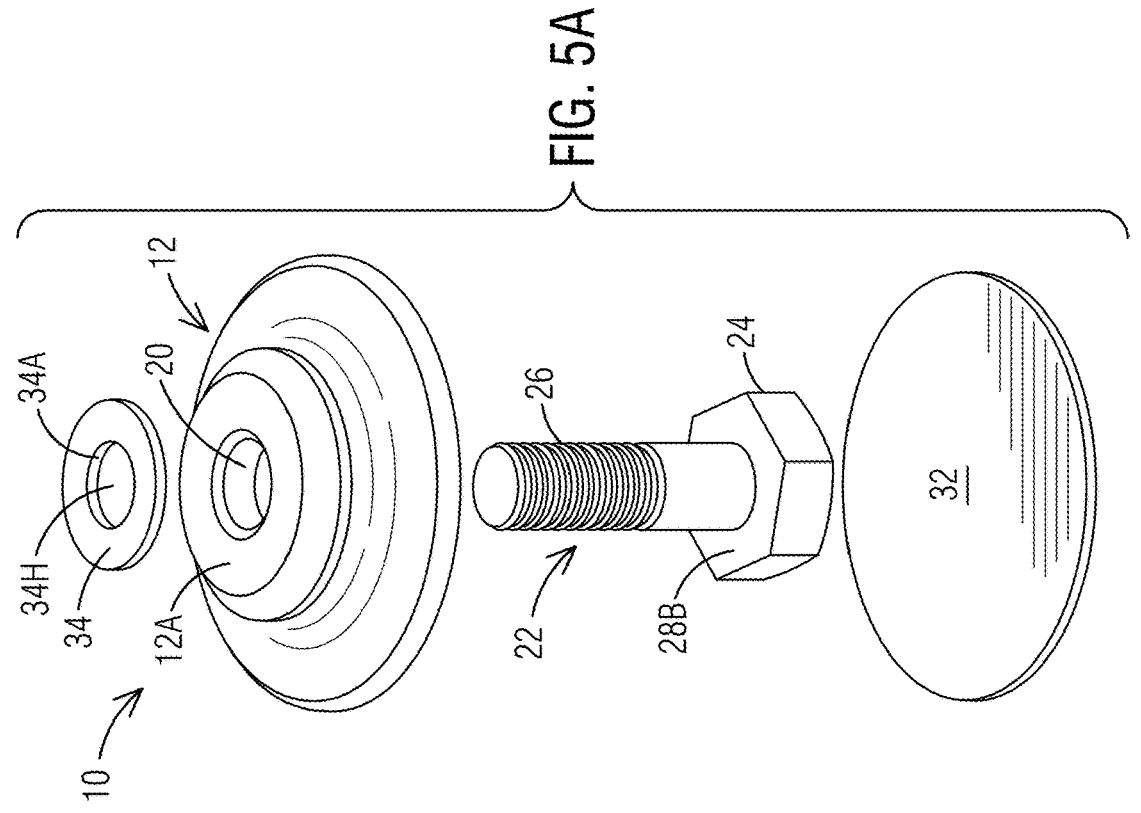
FIG. 5A

Section D-D

Section E-E

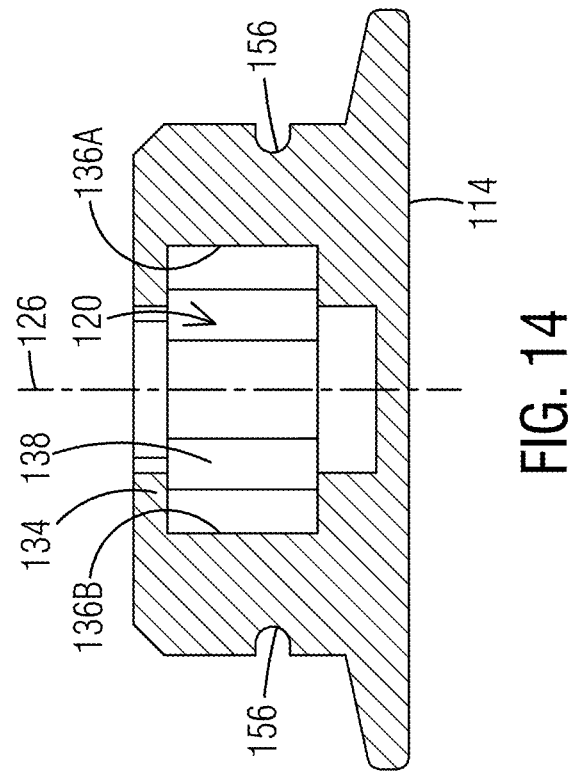
FIG. 14
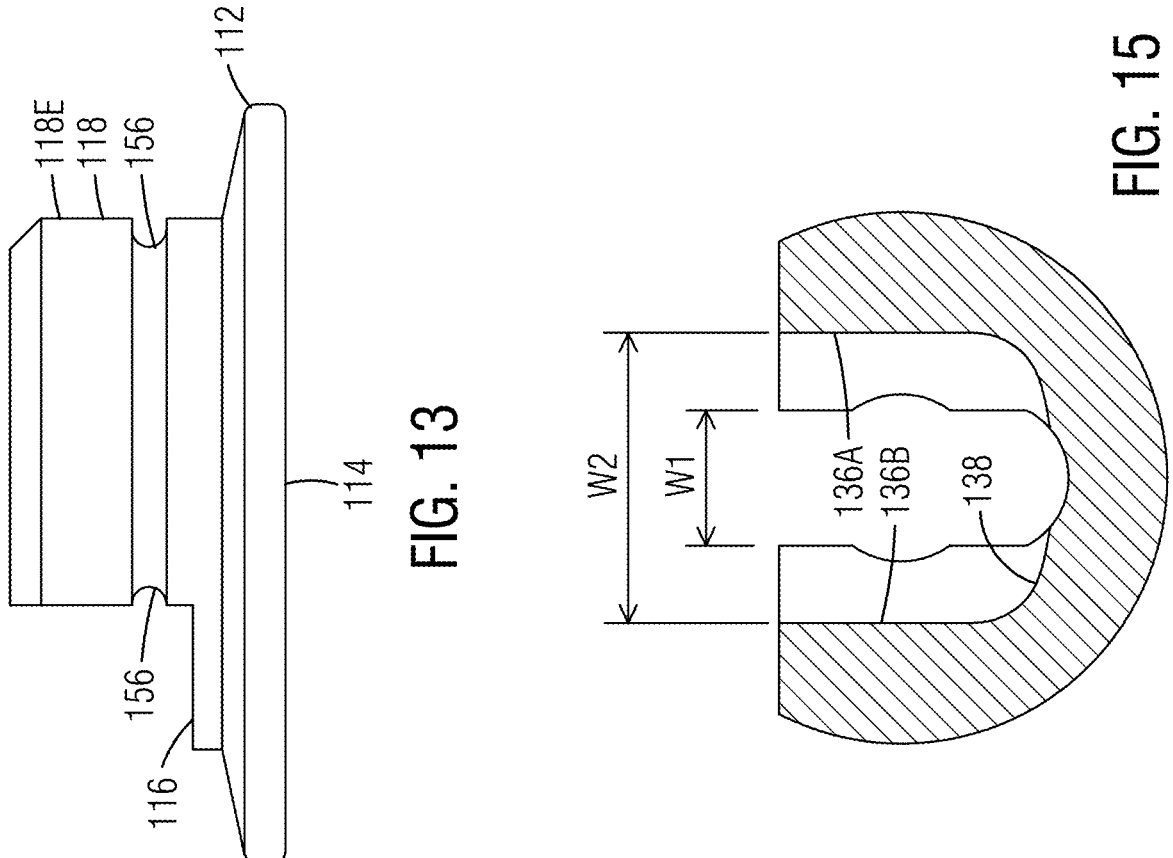
FIG. 13
FIG. 15

FASTENER STANDOFF MOUNT

BACKGROUND OF THE INVENTION

The inventions disclosed and claimed herein relate to fasteners and fastening systems. The fasteners have particular uses in connection with high performance racing automobiles, airplanes and marine vehicles. More specifically, the inventions pertain to standoff mounts for fasteners or fastening systems.

Fastener standoff mounts used in the automobile racing and aeronautics industry typically include a fastener, such as a bolt, that is especially adapted to be fixed in a base that is bonding to a mounting surface. The base has a disk-like shape with a recess or chamber to receive a head of the fastener, such as a base. A raised portion of the base and a thickness dimension, at least in part, define a standing spacing between two panels. The base includes a recess or chamber within which the head of the fastener is seated, and a threaded stud of the fastener extends from the head through a hole in the raised portion. An adhesive is applied to the bottom surface of the base to fix the standoff mount to a surface.

One drawback of these standoff fastening systems is that the fastener is specially adapted to fit the standoff mount so that the mount is not capable of receiving standard hex-head fastener heads. In addition, some standoff mounts are designed such that the head of the fastener is seated and fixed within an enclosed chamber. Such an arrangement also prevents replacing the fastener associated with the mount with another fastener. Indeed, if the mount is fixed to a surface the entire mount must be replaced if a different sized fastener is required. That is, a sized fastener is required or the fastener must be replaced.

SUMMARY

A standoff mount for a fastener, according to aspects of the invention herein, comprises a base comprising: a flange that defines at least part of a flat bottom surface; and a raised portion that extends upward from the flange and that comprises a top end facing opposite the flat bottom surface; a recess that is recessed into the flat bottom surface and that comprises two parallel flat surfaces that are dimensioned to trap therebetween a hex head of a conventional fastener and thereby prevent rotation of the hex head; and a cylindrically shaped aperture that originates at the recess, that extends through the top end of the raised portion, that is aligned with the recess, and that comprises a diameter which corresponds to a diameter of a threaded stud of the conventional fastener.

A standoff mount for a fastener, according to aspects of the invention herein, comprises a flange that defines at least part of a flat bottom surface; a raised portion that extends upward from the flange; a hex shaped recess that is recessed into the flat bottom surface and that is configured to receive a hex head of a conventional hex head bolt therein and to prevent rotation of the hex head disposed therein; a cylindrically shaped aperture extending from a base of the hex shaped recess and through and out the raised portion, and configured to permit a threaded stud of the conventional hex head bolt to pass therethrough. When the threaded stud is installed in the cylindrically shaped aperture and the hex head is disposed in the hex shaped recess, a first surface of the hex head is exposed and flush with the flat bottom surface.

A standoff mount for a fastener, according to aspects of the invention herein, comprises a base comprising a flat bottom surface and a top surface facing opposite the flat bottom surface; and a housing comprising a side wall that extends upward from the top surface along a central longitudinal axis and a top end. The top surface, the side wall, and the top end define a chamber configured to receive therein a conventional hex nut or a hex head of a conventional fastener, to position the conventional hex nut or the hex head concentric with the central longitudinal axis, and to prevent rotation thereof. The side wall defines an opening therethrough and in communication with the chamber. The top end defines a first slot therethrough and in in communication with the chamber. The opening is configured to permit the conventional hex nut or the hex head to be inserted though the opening into the chamber and the first slot is configured to permit an upwardly extending threaded stud of the conventional fastener to be moved thereinto and remain upright as the hex head is inserted into the chamber.

A standoff mount for a fastener, according to aspects of the invention herein, comprises a base comprising a flat bottom surface and a top surface facing opposite the flat bottom surface; and a housing comprising a side wall that extends upward from the top surface along a central longitudinal axis and a top end. The top end comprises an overhang that extends from the side wall toward the central longitudinal axis and defines a first slot through the top end. The top surface, the side wall, and the overhang define a chamber that is configured to trap therein a conventional hex nut or a hex head of a conventional fastener. The side wall defines an opening therethrough and into the chamber. The opening is configured to permit the hex head of the conventional fastener to be inserted into the chamber and the first slot is configured to permit an upwardly extending threaded stud of the conventional fastener to be moved thereinto and remain upright as the hex head is inserted into the chamber.

A standoff mount for a fastener, according to aspects of the invention herein, comprises a base including a flange with a flat bottom surface and a raised portion extending outward from the flange. The raised portion has a top end facing opposite the bottom surface of the base and flange, and the flange extends annularly under and about the raised portion. A recess is in the base with an opening through the bottom surface, wherein the recess is dimensioned to receive a head of a fastener and the flange extends annular about the recess. An aperture is through the top end of the raised portion and in communication with the recess, and the aperture is concentrically aligned with the recess, and the aperture has a diameter that corresponds to a diameter of a threaded stud of the fastener; and, wherein the fastener threaded stud is inserted through the recess and aperture, and a surface of the head is exposed and generally flush with the bottom surface of the base and flange for application of an adhesive or bonding agent on the bottom surface of the base and flange and the surface of the head.

A standoff mount, according to the invention comprises a base having a flat bottom surface and a top surface facing opposite the bottom surface. A housing is on the top surface of the base extending outwardly therefrom, and the base extends annularly about and/or under the housing, and the housing includes a chamber dimensioned to receive a nut or a head of fastener that includes a threaded stud. The housing further may comprise a first slot through a top end of the housing in communication with the chamber and the first slot has a width dimension centered relative to a common central axis through the housing and base; and, a second slot through a side of housing in communication with the chamber and the first slot, and the second slot has a width dimension that is centered relative to the central axis of the base and housing and centered relative to a central longitudinal axis of the first slot. A resilient retainer device is seated in a channel on the housing and the retainer device in the channel extends annularly around the housing, and the retainer device has a first end spaced apart from a second end both of which are disposed at the second slot on the side of the housing.

BRIEF DESCRIPTION OF THE DRAWINGS

FIG. 1 is an elevational view of an embodiment of a standoff mount for a fastener standoff mount according to aspects of the invention disclosed herein.

FIG. 2 is a top view of the standoff mount of FIG. 1.

FIG. 3 is a bottom view of the standoff mount of FIG. 1.

FIG. 4 is a sectional view of the standoff mount of FIG. 1 taken along section line A-A of FIG. 1.

FIGS. 5A-5E are different views of the standoff mount with a bolt and in accordance with aspects of the invention.

FIG. 13 is a side elevational view of the base of FIG. 11.

FIG. 14 is a sectional view of the base taken along section line D-D of FIG. 11.

FIG. 15 is a sectional view of the base taken along section line B-B of FIG. 11.

DETAILED DESCRIPTION OF THE INVENTION

Figure 5E:
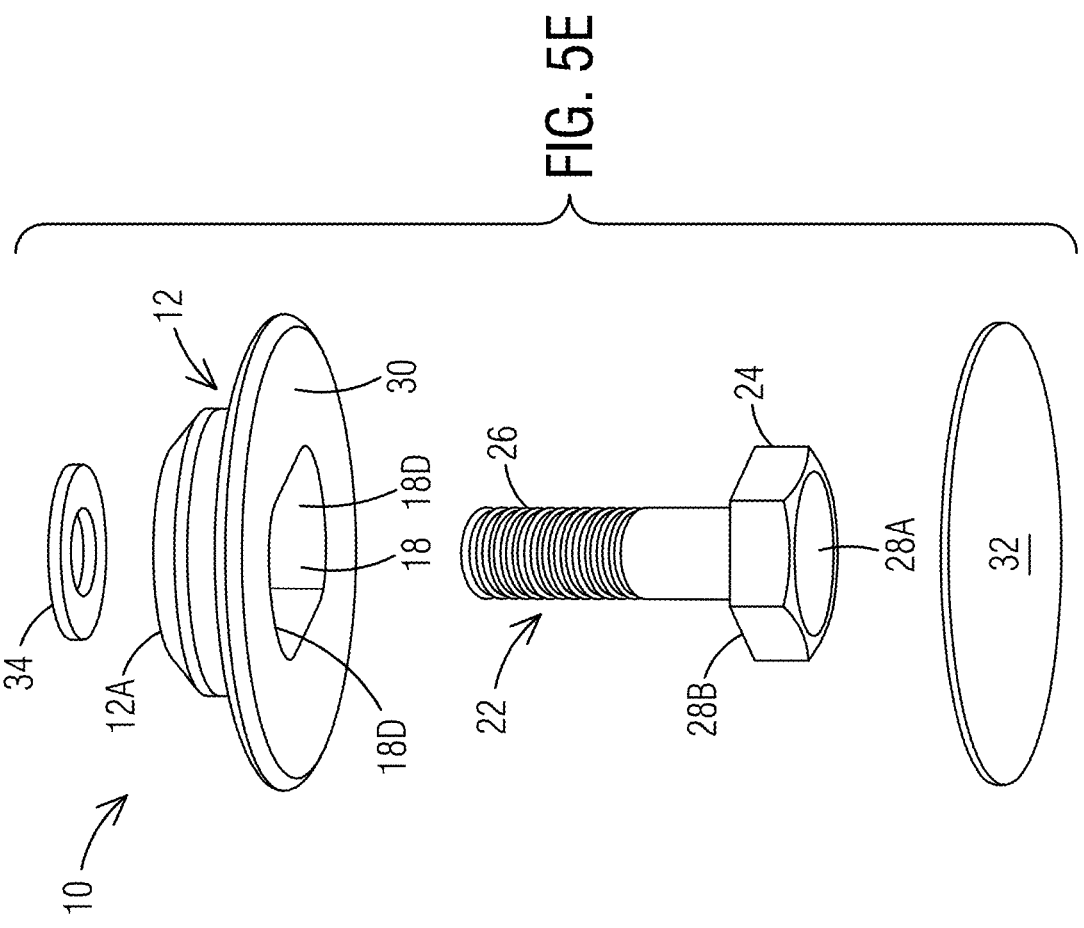

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As used herein, conventional bolts means bolts manufactured to standard SAE or metric sizes or to Army Navy (AN) standards. Similarly, conventional nuts include nuts manufactured to standard SAE or metric sizes or to Army Navy (AN) standards.

With respect to FIGS. 1-4 an embodiment of a fastener standoff mount is shown that may be used with conventional bolts having a hex head or with conventional hex nuts.

The standoff mount 10 includes a base 12 having a flange 14 that extends circumferentially around a raised portion 16. In this embodiment the base 12 has a circular configuration, but it may have other shapes such as rectangular, in which case the flange 14 extends about a perimeter of the raised portion 16. When standoff mount 10 is used in connection with a nut or fastener/bolt, the combination may be referred to as a standoff assembly.

Figure 5D:
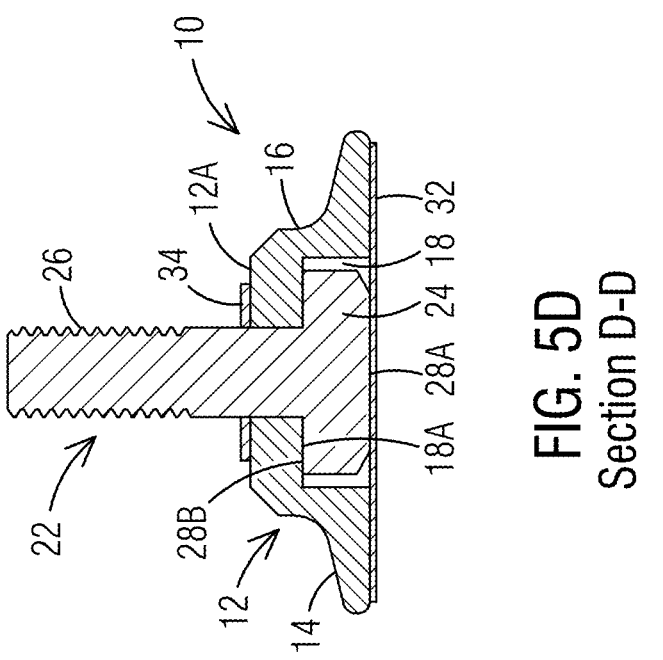

The base 12 further includes a recess 18 and an aperture 20 (e.g. a cylindrically shaped opening) that extends from the recess 18, through and out a top end 12A of the base 12 and that is in communication with the recess 18. The aperture may have a cylindrical shape along its entire length. The recess 18 and aperture 20 are dimensioned to receive a conventional fastener 22 such as a bolt that includes a head 24 (e.g., a hex head) and a threaded stud 26. The recess 18 and the aperture 20 are optionally concentric with each other. As illustrated in the embodiment shown in FIGS. 3 and 4, recess 18 may have a hexagonal configuration. The recess 18 (e.g., hex shaped) has a depth dimension D such that when the fastener 22 is inserted into the standoff mount 10, a first surface 28A of the head 24 is substantially flush with a bottom surface 30 of flange 14 and base 12, into which bottom surface 30 the recess 18 is recessed, as shown in FIGS. 5C and 5D. A second surface 28B of the head 24 abuts a base surface 18A of the recess 18. As can be seen between FIGS. 3 and 4, a width distance Dw between two parallel flat surfaces 18B, 18C of the hex shape of the recess 18 is constant from the flat bottom surface 30 to the base surface 18A and thereby to the aperture 20.

The standoff mount 10 as described above may be configured/dimensioned as set forth in FIGS. 5A-5E to receive and support conventional fasteners such as bolts that are different sized bolts with the same head dimensions. According to some standardized systems, different bolts may have different stud lengths, different thread sizes and the like, but the dimensions of the head of the bolts are the same.

Example conventional fasteners/bolts 160 that the standoff mount 110 may be dimensioned to secure include AN3 bolts (e.g., 10-32 bolts) having a ⅜ hex head (Dw=0.378–0.388) with various threaded stud lengths.

Standoff mount 10, or recess 18 of the mount, fits the head 24 of fasteners/bolt 22 having different dimensions. Consequently, the conventional fasteners are interchangeable with the mount. In this manner, depending on the application, a user may have an inventory of conventional/standardized bolts and use conventional bolts with the standoff mount 10 according to a particular application. The above-referenced prior art standoff mount systems may include a specially dimensioned/adapted bolt or bolt head that limits the interchangeability or use with standardized bolts, and often the specialized bolt is permanently fixed in the mount, so bolts, especially standardized bolts, are not interchangeable in the standoff mount.

Again, with respect to FIGS. 5A-5E a fastener/bolt 22 is shown in connection with standoff mount 10. As shown, the threaded stud 26 of fastener/bolt 22 is inserted through aperture 20 so the head 24 of the fastener/bolt 22 is seated snugly within recess 18. The recess 18 is dimensioned to correspond to the shape of the head 24 so the first surface 28A of head 24 is flush with a bottom surface 30 of standoff mount 10. A retainer 34 is provided at the top end 12A of base 12 at the aperture 20. The retainer 34 comprises a radially inner surface 34A that defines a through hole 34H. The radially inner surface 34A provides a frictional interface to threaded stud 26 to retain the threaded stud 26 in the aperture 20 and thereby retain the fastener/bolt 22 within the standoff mount 10. An adhesive, bonding agent 32 or the like may be applied to surfaces 28A and 30 so the mount may be affixed to, for example, a surface of a panel (not shown). The adhesive may be a double sided acrylic high-bond tape manufactured by 3M™, or similar tapes. Alternatively, the adhesive 32 may include paste-like bonding agents like FUSION BOND 375 manufactured by HERNON® Formulating Solutions. Any bonding agent is preferably applicable and functional with a variety of substrates including metals, rubber, plastic, epoxyglass, phenolic, PVC substrates and is sufficiently strong to hold the standoff assembly including the standoff mount 10 and fastener/bolt 22 and support for example another structure as a panel so the two panels are fixed in spaced relation to one another. The standoff mount 10 may be secured to a substrate after or before the fastener/bolt is fixed in the recess 18 of standoff mount 10. As can best be seen in FIGS. 5D and 5E, the recess 18 is free of any feature configured to prevent the hex head 24, and thereby the fastener/bolt 22, from falling out of the recess 18 when the fastener/bolt 22 and the standoff mount 10 are oriented as shown in FIGS. 5D and 5E. Similarly, the aperture 20 is free of any feature (e.g., internal threads) configured to prevent the threaded stud 26, and thereby the fastener/bolt 22, from falling out of the recess 18 when the fastener/bolt 22 and the standoff mount 10 are oriented as shown in FIGS. 5C and 5D. As can be seen in FIG. 5E, the two parallel flat surfaces 18B, 18C may be connected to each other with curved surfaces 18D.

Standoff mount 10 may be fabricated from known materials such as thermosets or thermoplastic materials and metals such as aluminum or stainless steel, and other materials known to those skilled in the art to support structures and secure structures such as panels. Different manufacturing processes may be used to fabricate or form the mounts depending on the material composition. For example, thermosets and thermoplastic materials may be formed using known injection molding and other manufacturing processes known to those skilled in the art. Milling and machining systems, and other systems and processes known to those skilled in the art, may be used to fabricate mounts composed of metallic materials such as aluminum, stainless steel, or other metal alloys.

Figures 6, 7:
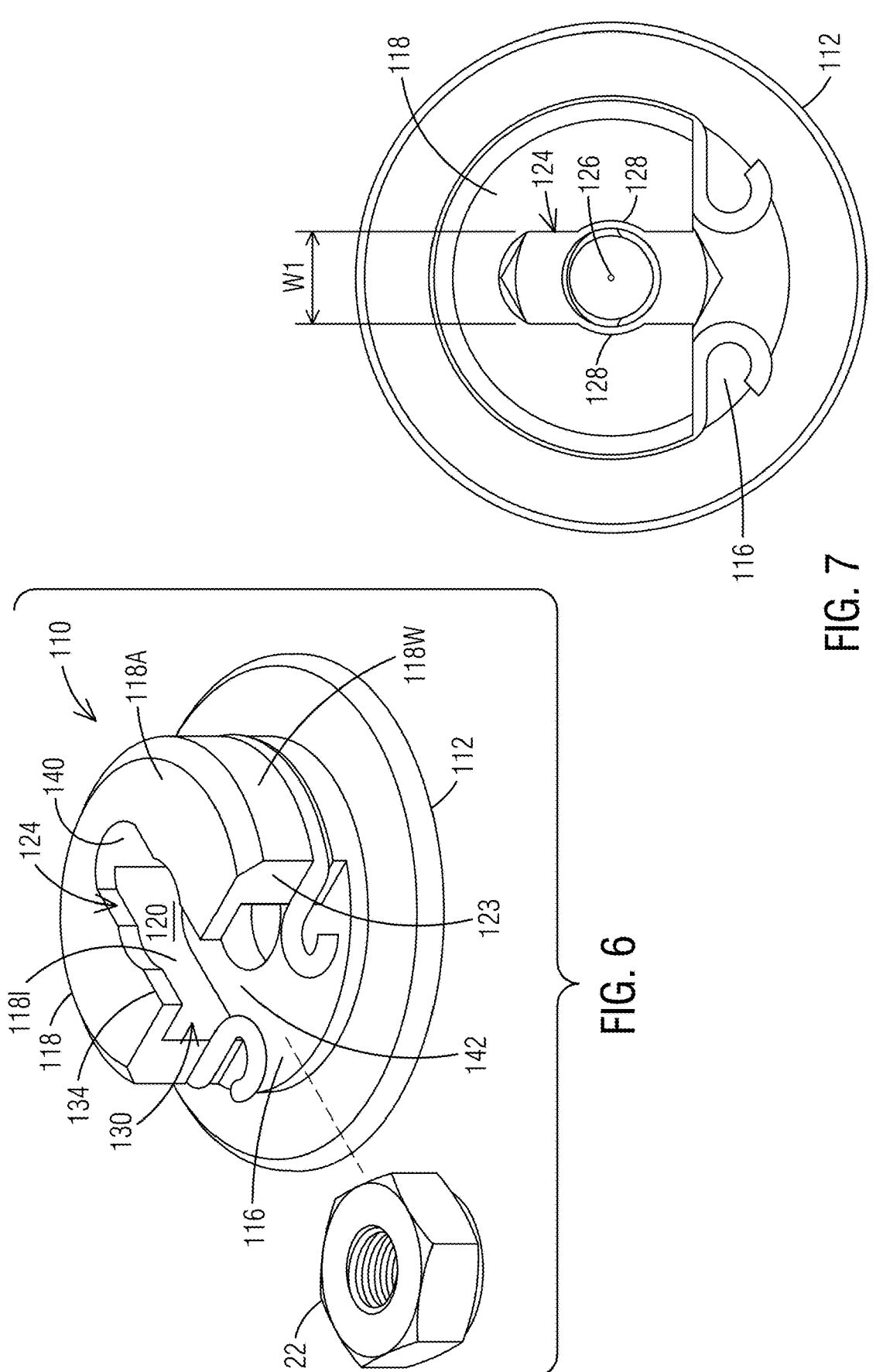
FIG. 6 is a perspective view of an embodiment of a standoff mount for a fastener according to aspects of the invention disclosed herein and including a hex-head lock nut.
FIG. 7 is a top view of the standoff mount of FIG. 6

With respect to FIG. 6, an alternate example embodiment of a standoff mount 110 is shown and is configured to receive the hex head and stud of a conventional fastener or a conventional nut of a fastener. The standoff mount 110 is also designed such that once secured to a surface a fastener or nut is removable, for example, in the case the same must be replaced after wear, or to adapt a fastening system according to specifications.

Figures 8, 9, 10:
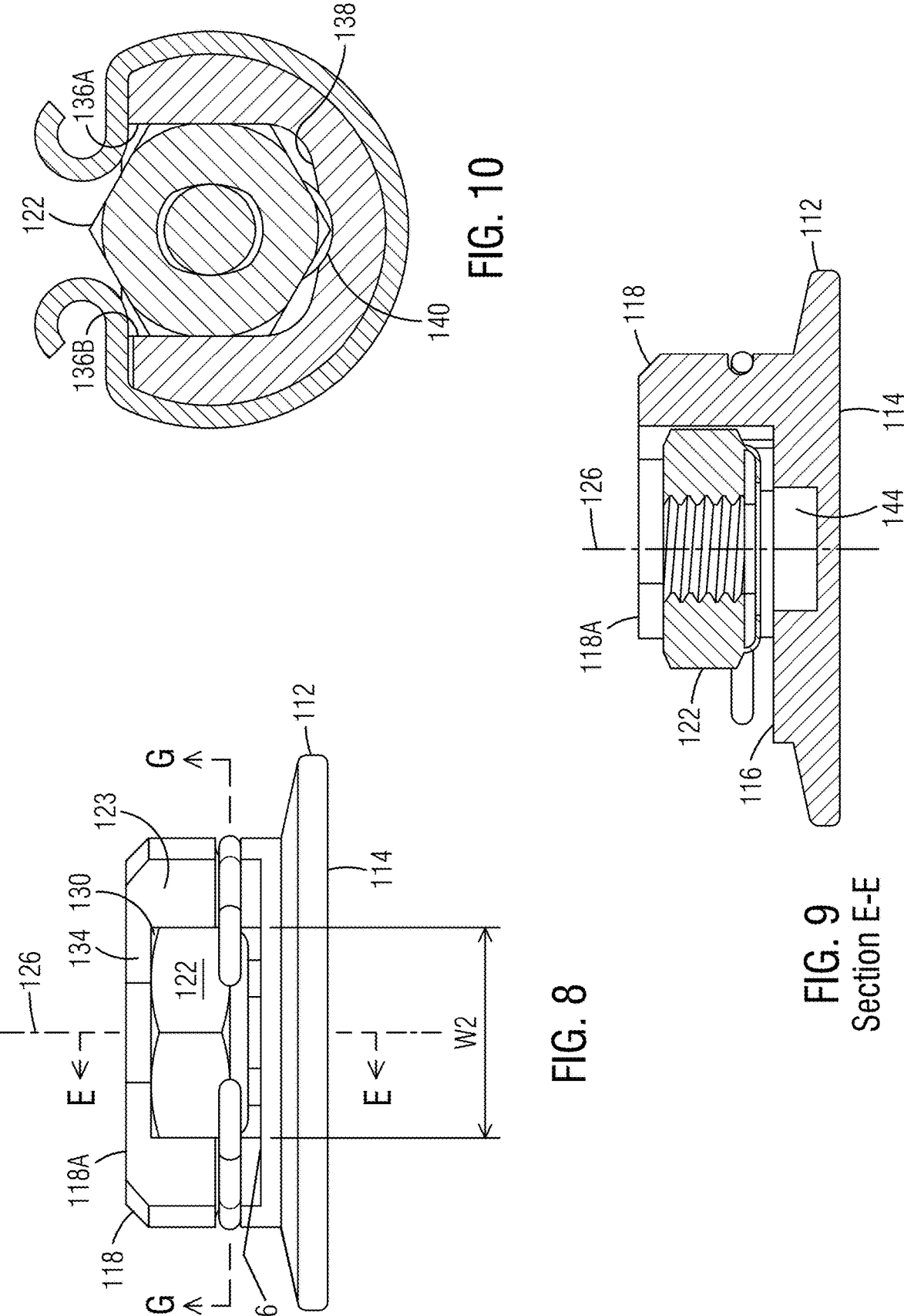
FIG. 8 is a front elevational view of the standoff mount of FIG. 6.
FIG. 9 is a sectional view of the standoff mount of FIG. 6 taken along section line E-E of FIG. 8.
FIG. 10 is a sectional view of the standoff mount of FIG. 5 taken along section line G-G of FIG. 8.
Figure 11:
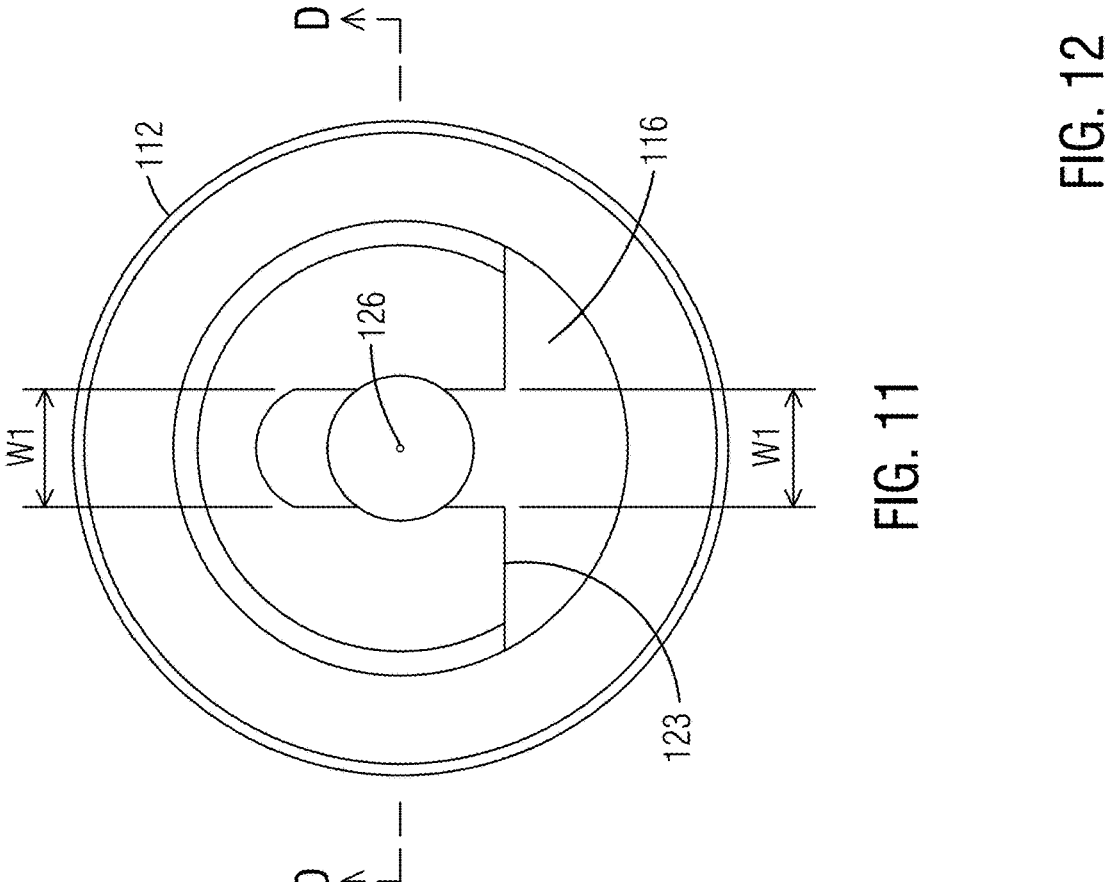
FIG. 11 is a top view of the standoff base for the mount according to aspects of the invention disclosed herein.

The standoff mount 110 of FIG. 6 includes a base 112 having a flat bottom surface 114 (FIGS. 9 and 11). A housing 118 includes a side wall 118W that extends outward from a top surface 116 of the base 112, that extends opposite the bottom surface 114, and that extends along a central longitudinal axis 126, as well as a top end 118A secured to the side wall 118W. The top surface 116 may be parallel to the flat bottom surface 114. Housing 118 defines chamber 120 that is dimensioned to receive a nut 122 (e.g., a hex nut) or the head of a fastener. Housing 118 may have a truncated cylindrical shape as shown in including the top end 118A facing opposite the bottom surface 114 of the base 112. In addition, housing 118 may include a side face 123 that may be planar, that is defined by the side wall 118W, that may be generally perpendicular to the top surface 116 of the base 112 and a surface of the top end 118A, and that defines an opening 130 through the side wall 118W.

As further shown in FIG. 6, a first slot 124 passes through the top end 118A of the housing 118, is in communication with the chamber 120, and extends from the face 123 past the central longitudinal axis 126 of the base 112 or mount 100. With respect to FIG. 11, the first slot 124 has a width dimension W1 (FIGS. 7 and 11) that is centered relative to central longitudinal axis 126. In a preferred embodiment, and as shown in FIG. 7, the first slot 124 may have a pair of outwardly curved surfaces or edges 128 defining a diameter to receive a stud of a fastener positioned on the standoff mount 110. The outwardly curved surfaces or edges 128 are dimensions to allow for slight lateral movement (perpendicular to the central longitudinal axis 126) of the hex nut 122 or the hex head 164 to enable proper alignment of the components of the assembly despite possible misalignments due to manufacturing tolerances.

The opening 130 through the face 123 of housing 118 is in communication with the chamber 120 and the first slot 124 and may have a width that is equal to a width dimension W2 of the chamber 120. The width dimension W2 (FIGS. 8 and 12) at the face 123 is centered relative to central longitudinal axis 126 and relative to width dimension W1 of the first slot 124. As shown the width dimension W1 of the first slot 124 is less than the width dimension W2 of the chamber 120, and as a result an overhang 134 is formed. The overhang 134 extends from the side wall 118W to the first slot 124 and defines part of the chamber 120. In addition, two parallel walls 136A, 136B are defined by an interior surface 118I of side wall 118W and extend from the opening 130 to a back wall 138. The walls 136A, 136B, 138 and overhang 134 define chamber 120. The walls 136A, 136B are configured to trap the hex nut 122 or the hex head 164 therebetween and to physically interfere with movement of corners of the hex nut 122 or the hex head 164 should the hex nut 122 or the hex head 164 begin to rotate. The overhang 134 prevents the hex nut 122 or the hex head 164 from moving upward, thereby trapping the hex nut 122 or the hex head 164 in the chamber 120.

Figures 16A, 16B, 17A, 17B:
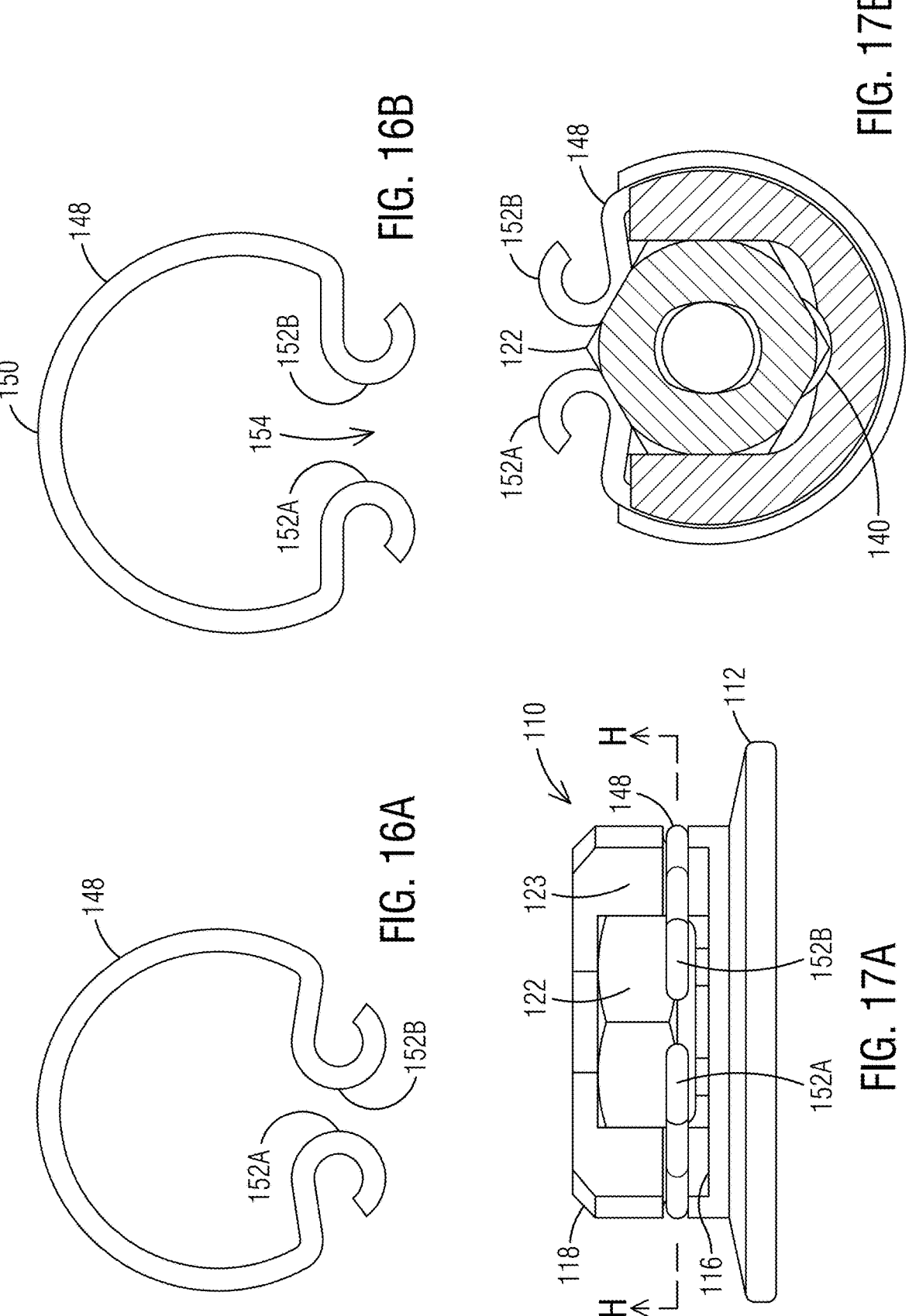
FIGS. 16A and 16B are views of a retainer device for the standoff mount in a manufactured state (FIG. 16A) and an installed state (FIG. 16B).
FIG. 17A is an elevational view of the standoff mount with a hex-head nut installed.
FIG. 17B is a sectional view of the standoff mount of FIG. 16A.

In reference to FIGS. 7, 10 and 15, the back wall 138 includes a curvature 140 along its surface that curves radially outward relative to central longitudinal axis 126. Accordingly, chamber 120 is configured to receive a hexagonally shaped nut (FIG. 10) or fastener head. As shown in FIGS. 10 and 17B, for example, the walls 136A, 136B, 138 are dimensioned and spaced relative to one another to receive a nut 122 or fastener to control, prevent or minimize any rotational movement within the chamber 120.

In addition, housing 118 and chamber 120 include floor 142 (FIGS. 6 and 9) to support the hex nut 122 or the hex head 164, and floor 142 is part of the top surface 116 of base 112. As further shown with respect to FIGS. 6, 9 and 14, a blind hole 144 recessed into the top surface 116 toward the bottom surface 114 of the base 112 and terminats a distance/space from the bottom surface 114. The blind hole 144 (clearance hole) is configured to be concentrically aligned with the nut 122 or at least have the central longitudinal axis 126 pass therethrough (in the case of irregularly shaped blind holes) and this positioning allows the blind hole 144 to provide clearance for an end of the stud of a fastener threaded through nut 122.

The standoff mount 110 may also include a retention means for securing or holding a nut or fastener in the chamber 120 and housing 118. The retention means may include a resilient retainer device 148 that is seated on housing 118 and is spaced above floor 142 and base 112. In a preferred embodiment, the retainer device 148 is a spring-loaded or biased loaded clip that includes a generally circular intermediate section 150 connecting two opposite ends 152A (first end), 152B (second end) that are spaced apart forming a gap 154 therebetween. The clip 148 is spring-loaded in the sense that two ends 152A, 152B are biased together. In FIG. 16A, clip 148 is shown in a manufactured or pre-installation state with the ends 152A, 152B biased toward one another. In FIG. 16B, the clip 148 is illustrated in an installed state, for example installed on the housing 118 with the ends 152A, 152B separated relative to a pre-installed state.

Figure 12:
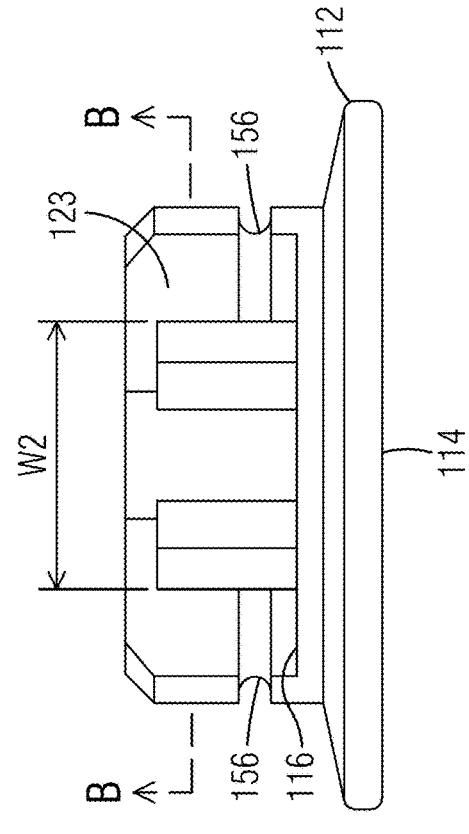
FIG. 12 is a front elevational view of the base of FIG. 11.

As shown in FIGS. 12-14, housing 118 includes channel 156 (FIGS. 12-14) in an exterior surface 118E of the housing 118 and extends (e.g., annularly) thereon. More specifically, channel 156 extends from one end of the opening 130 along an exterior side of housing 118 to the other opposite end of the opening 130. Opposing ends 152A, 152B of the clip 148 include arcuate shapes so that when flat surfaces of the nut 122 or hex head 164 press on the arcuate shaped ends 152A, 152B, the resilient nature of the clip allows the ends to yield to the nut 122 or hex head 164, which can then pass by the ends 152A, 152B, through the gap 154, and into chamber 120. Once the nut 122 or hex head 164 pass the ends 152A, 152B, the ends 152A, 152B close together again due to the resilience of the clip 148, which secures the nut 122 or hex head 164 in the chamber 120.

In the case where the hex head 164 of the fastener/bolt 160 is being inserted into the chamber 120, the threaded stud 162 of the fastener/bolt 160, which extends vertically upward from the hex head 164, can enter the first slot 124 and is thereby free to remain upright as it moves with the hex head 164 while the hex head 164 is inserted into the chamber 120.

Figures 18A, 18B, 18C:
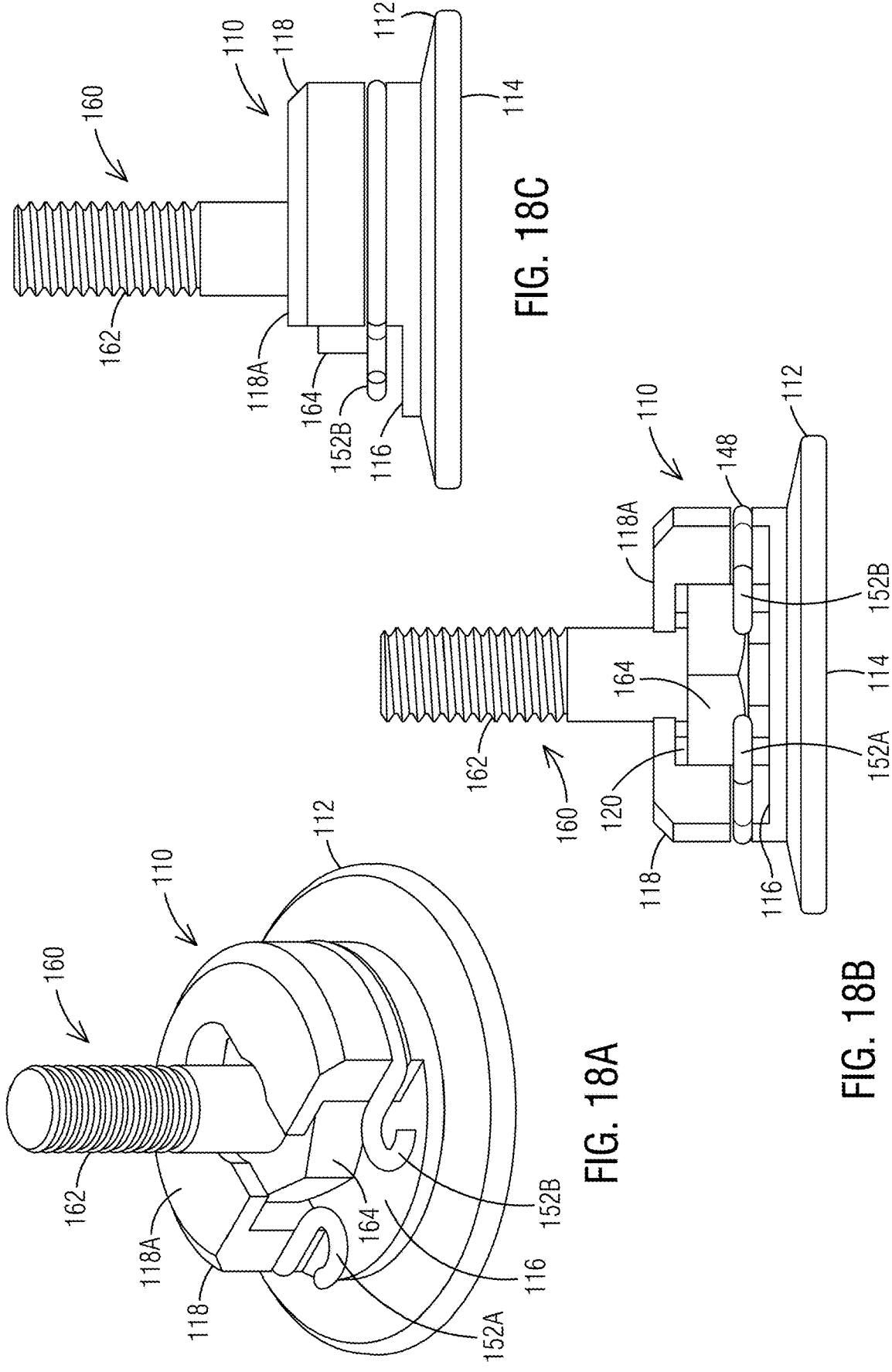
FIGS. 18A-18C are the standoff mount according to aspects of the invention including a fastener/bold secured therein.

The standoff mount 110 of FIGS. 18A-18C is shown with the fastener bolt 160 secured thereon. As shown the fastener/bolt 160 is a typical such fastener including the hex head 164 and threaded stud 162. Similar to securing the above-referenced nut 122, the clip 148 secures the fastener/bolt 160 in the housing 118 and chamber 120. The hex head 164 of the fastener/bolt 160 is forced through the opening between the ends 152A, 152B of clip/retaining device 148 so the hex head 164 of the fastener/bolt 160 is secured in housing 118 and chamber 120. Alternatively, the clip 148 may be fitted in channel 156 on housing 118 after the hex head 164 of fastener/bolt 160 is inserted into the chamber 120 of housing 118.

Example conventional hex nuts 122 that the standoff mount 110 may be dimensioned to secure include AN 364 nuts such as an AN364 10-32 nut with a ⅜ hex (W2=0.378–0.388).

Example conventional fasteners/bolts 160 that the standoff mount 110 may be dimensioned to secure include AN3 bolts (e.g., 10-32 bolts) having a ⅜ hex head (Dw=0.378–0.388) with various threaded stud lengths.

In this manner, standoff mount 110 with the fastener/bolt 160 may be secured to a substrate. Alternatively, the standoff mount 110 may be secured to a substrate and then the fastener/bolt 160 is inserted in the chamber 120 of housing 118 and to the standoff mount 110. Known bonding agents or adhesives may be used to secure the standoff mount 110 to a substrate. For example, a double sided acrylic high-bond tape manufactured by 3M™, or similar tapes may be used. Alternatively, the adhesive 32 may include paste-like bonding agents like FUSION BOND 375 manufactured by HERNON® Formulating Solutions. Any bonding agent is preferably applicable and functional with a variety of substrates including metals, rubber, plastic, epoxyglass, phenolic, PVC substrates and is sufficiently strong to hold the standoff assembly including the standoff mount 110 and fastener/bolt 160 or nut 122 and support for example another structure as a panel so the two panels are fixed in spaced relation to one another.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

The invention claimed is:

1. A standoff mount, comprising:

a base comprising: a flange that defines at least part of a flat bottom surface; and a raised portion that extends upward from the flange and that comprises a top end facing opposite the flat bottom surface;

a recess that is recessed into the flat bottom surface and that comprises two parallel flat surfaces that are dimensioned to trap therebetween a hex head of a conventional fastener and thereby prevent rotation of the hex head;

a cylindrically shaped aperture that originates at the recess, that extends through the top end of the raised portion, that is aligned with the recess, and that comprises a diameter which corresponds to a diameter of a threaded stud of the conventional fastener; and a retainer that is configured to rest on the top end of the raised portion and that defines a through hole configured to provide a frictional interface against the threaded stud of the conventional fastener and thereby retain the threaded stud in the cylindrically shaped aperture.

2. The standoff mount of claim 1,
wherein when the threaded stud is installed in the cylindrically shaped aperture and the hex head is disposed in the recess, a first surface of the hex head is exposed and flush with the flat bottom surface.

3. The standoff mount of claim 2,
wherein the recess comprises a base surface that connects the two parallel flat surfaces; and
wherein when the threaded stud is installed in the cylindrically shaped aperture, the hex head is disposed in the recess, and the first surface of the hex head is flush with the flat bottom surface, a second surface of the hex head abuts the base surface.

4. The standoff mount of claim 1,
wherein the recess is free of any feature configured to prevent the hex head from falling out of the recess.

5. The standoff mount of claim 1,
wherein the cylindrically shaped aperture is free of any feature configured to prevent the threaded stud from falling out of the recess.

6. The standoff mount of claim 1,
wherein the cylindrically shaped aperture is free of internal threading.

7. The standoff mount of claim 1,
wherein the conventional fastener comprises at least one of a 10-32 bolt comprising a 5/16 hex head, an 8-30 bolt comprising a ¼" hex head, and a ¼-28 bolt comprising a 7/16" hex head.

8. The standoff mount of claim 1,
wherein a distance between the two parallel flat surfaces is constant from the flat bottom surface to the cylindrically shaped aperture.

9. The standoff mount of claim 1,
further comprising an adhesive disk configured to be secured to the flat bottom surface.

10. A standoff mount, comprising:
a flange that defines at least part of a flat bottom surface;
a raised portion that extends upward from the flange;
a hex shaped recess that is recessed into the flat bottom surface and that is configured to receive a hex head of a conventional hex head bolt therein and to prevent rotation of the hex head disposed therein;
a cylindrically shaped aperture extending from a base of the hex shaped recess and through and out the raised portion, and configured to permit a threaded stud of the conventional hex head bolt to pass therethrough;
wherein when the threaded stud is installed in the cylindrically shaped aperture and the hex head is disposed in the hex shaped recess, a first surface of the hex head is exposed and flush with the flat bottom surface; and
a retainer that is configured to rest on a top end of the raised portion and that defines a through hole configured to provide a frictional interface against the threaded stud of the conventional hex head bolt and thereby retain the threaded stud in the cylindrically shaped aperture.

11. The standoff mount of claim 10,
wherein the hex shaped recess and the cylindrically shaped aperture are concentric with each other.

12. The standoff mount of claim 10,
wherein the hex shaped recess comprises two parallel flat surfaces and a base surface that connects the two parallel flat surfaces; and
wherein when the threaded stud is installed in the cylindrically shaped aperture, the hex head is disposed in the hex shaped recess, and the first surface of the hex head is flush with the flat bottom surface, a second surface of the hex head abuts the base surface.

13. The standoff mount of claim 10,
wherein the hex shaped recess is free of any feature configured to prevent the hex head from falling out of the hex shaped recess.

14. The standoff mount of claim 10,
wherein the cylindrically shaped aperture is free of any feature configured to prevent the threaded stud from falling out of the hex shaped recess.

15. The standoff mount of claim 10,
wherein the cylindrically shaped aperture is free of internal threading.

16. The standoff mount of claim 10,
wherein the conventional hex head bolt comprises at least one of a 10-32 bolt comprising a 5/16 hex head, an 8-30 bolt comprising a ¼" hex head, and a ¼-28 bolt comprising a 7/16" hex head.

17. The standoff mount of claim 10,
wherein the hex shaped recess comprises two parallel flat surfaces and a base surface that connects the two parallel flat surfaces; and
wherein a distance between the two parallel flat surfaces is constant from the flat bottom surface to the cylindrically shaped aperture.

18. A method of securing a standoff to a panel, the method comprising:
inserting a conventional fastener into a standoff mount, wherein the conventional fastener comprises a head and a threaded stud attached to the head, the head comprising a first surface facing opposite the threaded stud, and wherein the standoff mount comprises:
a base comprising: a flange that defines at least part of a flat bottom surface; and a raised portion that extends upward from the flange and that comprises a top end facing opposite the flat bottom surface;
a recess that is recessed into the flat bottom surface and that comprises two parallel flat surfaces that are dimensioned to trap therebetween a hex head of the conventional fastener and thereby prevent rotation of the hex head;
a cylindrically shaped aperture that originates at the recess, that extends through the top end of the raised portion, that is concentrically aligned with the recess, and that comprises a diameter which corresponds to a diameter of the threaded stud of the conventional fastener;
wherein once the hex head is disposed in the recess the first surface of the head is flush with the flat bottom surface;
applying an adhesive to the flat bottom surface and to the first surface of the head; and
securing the flat bottom surface and the first surface of the head to the panel via the adhesive.

* * * * *